(12) United States Patent
Jolly

(10) Patent No.: US 7,678,993 B2
(45) Date of Patent: Mar. 16, 2010

(54) OUTLET BOX ASSEMBLY WITH ANCHOR SCREW GUIDE

(75) Inventor: Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 69 days.

(21) Appl. No.: 11/953,129

(22) Filed: Dec. 10, 2007

(65) Prior Publication Data

US 2008/0264665 A1 Oct. 30, 2008

Related U.S. Application Data

(60) Provisional application No. 60/914,064, filed on Apr. 26, 2007.

(51) Int. Cl.
*H02G 3/08* (2006.01)

(52) U.S. Cl. ............... 174/50; 174/480; 174/482; 174/58; 220/3.2; 248/906

(58) Field of Classification Search ............ 174/50, 174/53, 57, 58, 480, 481, 66, 67, 482, 559, 174/490; 220/3.2–3.9, 4.02, 241, 242; 248/906; 439/142, 535
See application file for complete search history.

(56) References Cited

U.S. PATENT DOCUMENTS

| | | | |
|---|---|---|---|
| 1,302,057 A | 4/1919 | Knight | |
| 2,757,817 A | 8/1956 | Egan | |
| 4,259,542 A | 3/1981 | Tehan et al. | |
| 4,264,779 A | 4/1981 | Rhodes et al. | |
| 4,323,724 A | 4/1982 | Shine | |
| 4,496,790 A | 1/1985 | Spencer | |
| 4,936,794 A | 6/1990 | Shaw et al. | |
| 5,393,930 A | 2/1995 | Wuertz | |
| 5,410,103 A | 4/1995 | Wuertz | |
| 5,600,093 A * | 2/1997 | Herth et al. | 174/53 |
| 5,641,940 A | 6/1997 | Whitehead | |
| 6,100,469 A | 8/2000 | Jorgensen et al. | |
| 6,943,295 B2 | 9/2005 | Herth | |
| 6,965,077 B2 * | 11/2005 | Halbert | 174/58 |
| 7,105,742 B1 | 9/2006 | Jolly | |
| 7,307,212 B1 * | 12/2007 | Gretz | 174/53 |
| 7,307,213 B1 * | 12/2007 | Gretz | 174/58 |

* cited by examiner

*Primary Examiner*—Angel R Estrada
(74) *Attorney, Agent, or Firm*—Hoffmann & Baron, LLP

(57) ABSTRACT

One aspect of the invention is an outlet box frame for installation in a hole in a floor structure. The hole having a perimeter and defining an internal wall surface in said floor structure. The frame including a walled member, at least one flange portion and a unitary retaining screw guide. The walled member being sized for insertion within the hole. The at least one flange portion extending outward from the walled member, wherein once installed at least a portion of the flange extends from the walled member past the internal wall surface. The unitary retaining screw guide supports a retaining screw. The screw guide being supported from the walled member and configured to receive the retaining screw therein. Upon installation, the retaining screw inserted in the retaining screw guide engages the hole wall without significant penetration thereof, providing at least pullout resistance of the frame from the hole. Alternatively, the outlet box frame may include the retaining screw.

20 Claims, 5 Drawing Sheets

OUTLET BOX ASSEMBLY WITH ANCHOR SCREW GUIDE

CROSS-REFERENCE TO RELATED APPLICATIONS

This application claims the benefit of U.S. Provisional Patent Application Ser. No. 60/914,064 filed on Apr. 26, 2007.

BACKGROUND OF THE INVENTION

The present invention relates generally to an electrical outlet box assembly, which houses power and/or communication lines and/or fixtures. More specifically, the present invention relates to an outlet box frame assembly having a frame, which includes a guide for holding one or more anchoring screws that provide support for the outlet box within a hole in a floor structure.

It is well known to use electrical outlet boxes to terminate or couple electrical wires and cables. Such outlet boxes permit the insertion of electrical wires into the box, which can pass through the box or terminate therein to electrical fixtures, such as switches and receptacles in an electrical outlet box. It has also become necessary to pass through or terminate communications wires for such purposes as data, voice and signal transmission and networking computers. While terminations of electrical wires are required to be housed in an electrical box, not all wires and cables are required to use an electrical box. Nonetheless, aesthetics, mechanical safety and convenience have dictated the need to place communication and other wires or cables in close proximity to the electrical terminations.

In office spaces and other commercial environments it is often desirable to have access to electrical outlets or other electrical connections at locations located a distance from standard wall outlets. In order to safely accommodate such situations, floor boxes and/or ceiling boxes are typically used. These boxes may be located in the floor or ceiling, near or at the location, such as under a work cubicle or near a piece of machinery, where the connection is needed.

One type of floor box, referred to as a poke-through floor box, is designed to be supported within a hole in a poured concrete floor. Contemporary poke-through floor boxes generally include a so-called "self-anchoring" assembly, which secures the poke-through structure within the hole in the floor structure. Generally, these self-anchoring assemblies employ a ring-shaped spring or retaining clip with one or more radially protruding elements. The retaining clip engages and bites into the surrounding wall structure of the hole as the assembly is inserted therein, in order to anchor the assembly in-place. However, due to the design and configuration of these retaining rings, the poke-through assembly is extremely difficult to remove or freely reposition once installed. In fact, removing or repositioning the assembly after installation can destroy the retaining clip and damage the poke-through assembly. Additionally, employing a retaining ring adds cost to the overall assembly, as they have to be custom manufactured for the particular type of floor box.

Accordingly, there is a need for an outlet box assembly that overcomes the shortcoming set forth above. In particular, there is a need for a floor box anchoring assembly that is easily adjusted after installation. Such an improved assembly is preferably inexpensive and installed easily.

SUMMARY OF THE INVENTION

One aspect of the present invention is an outlet box frame for installation in a hole in a floor structure. The hole having a perimeter and defining an internal wall surface in the floor structure. The frame includes a walled member, at least one flange portion and a unitary retaining screw guide for supporting a retaining screw. The walled member is sized for insertion within the hole. The at least one flange portion extends outward from the walled member toward and past the internal wall of the hole. Also, the screw guide is supported from the walled member and configured to receive the retaining screw therein. During and/or upon installation, the retaining screw is inserted in the screw guide and engages the internal wall surface of the hole without significantly penetrating it. Thus, the screw resists pullout and/or rotation of the frame relative to the hole.

Additionally, the outlet box frame can include a cover-mounting portion for securing an outlet box cover relative to the walled member. Also, the outlet box assembly can include the retaining screw disposed in the screw guide. The retaining screw can further provide rotational resistance for the frame relative to the hole. Further, a first portion of the screw guide can be configured to hold at least a central shaft portion of the retaining screw upon installation. Additionally, a second portion of the screw guide can be configured to hold a portion of the retaining screw remote from the central shaft portion. The first and second portions of the screw guide can be integrally formed.

Another aspect of the present invention is an outlet box assembly for installation in a hole in a floor structure. The assembly including a screw anchor and a frame. The frame allowing power and/or communication cables to pass therethrough. Also, the frame includes an external wall portion, at least one flange portion and a screw guide for supporting the screw anchor. The external wall portion covering a portion of the internal wall of the hole. The at least one flange portion extending from the external frame wall toward and past the internal wall of the hole. The screw guide disposed below the flange and configured to receive the retaining screw therein. Upon installation, the retaining screw disposed partially within the screw guide engages the internal wall of the hole without significant penetration thereof. The wall engagement by the screw prevents or resists pullout and/or rotation of the frame from the hole.

Yet another aspect of the present invention is an outlet box assembly for installation in a hole in a floor structure, where the hole defines internal walls that extend from an upper surface of the floor structure. The assembly includes a first and second frame element. The first frame element supports an outlet box cover. Also, the first frame element includes at least one protruding portion, wherein upon installation the protruding portion extends beyond the internal walls of the hole for engaging at least a portion of the floor upper surface. The second frame element extends from the first frame element. Upon installation the second frame element is substantially disposed within the hole. The second frame element includes a screw guide for supporting a retaining screw. The screw guide is configured to receive the retaining screw therein. Also, upon installation the retaining screw inserted in the screw guide engages the internal walls of the hole without significant penetration thereof. Thus, the screw resists pullout and/or rotation of the frame elements relative to the hole.

Further, the assemblies described above can include an intumescent member disposed below the frame for resisting heat transfer through the hole. Also, the flange portion can be integrally formed with the external frame wall. Additionally, the assemblies can include additional features from those described above, such as those recited above for the outlet box frame.

The preferred embodiments of the outlet box frame and assembly of the present invention, as well as other objects, features and advantages of this invention, will be apparent from the following detailed description, which is to be read in conjunction with the accompanying drawings.

BRIEF DESCRIPTION OF THE DRAWINGS

FIG. 4b is a side section view of an alternative assembly to that shown in FIG. 4a.

DETAILED DESCRIPTION OF THE PREFERRED EMBODIMENTS

Figure 1:
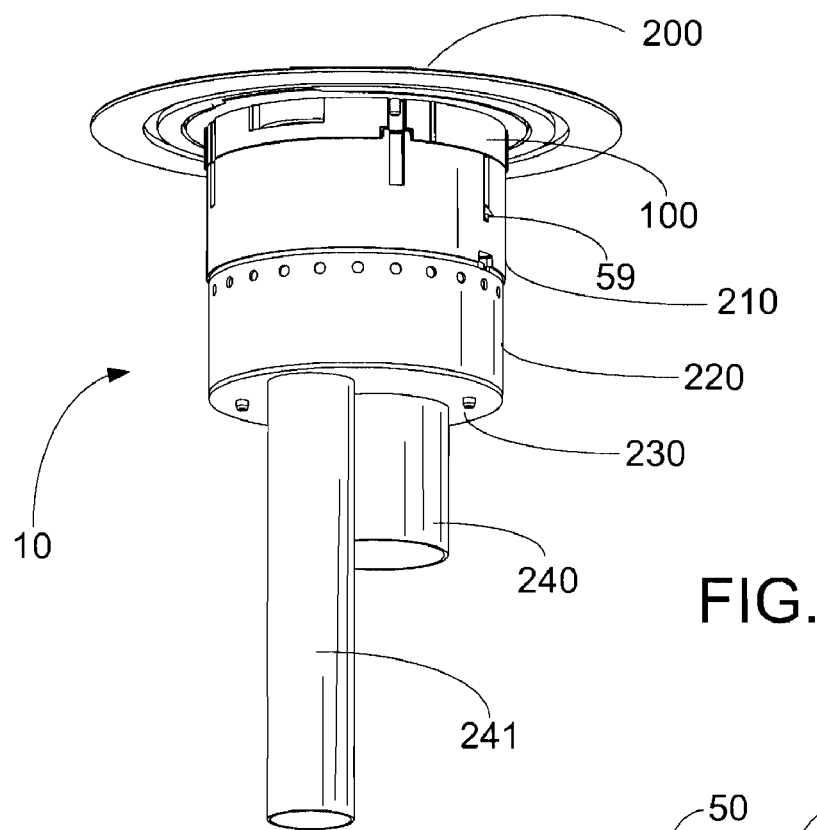
FIG. 1 is bottom perspective view of an electrical box assembly including a radially protruding anchor screw in accordance with the present invention.

Referring first to FIG. 1, the outlet box assembly 10, formed in accordance with the present invention, is shown. The outlet box assembly 10 shown includes a furniture feed design, which is preferably intended to allow wires or cables to pass therethrough between floors, without an electrical fixture or device mounted therein. However, one of ordinary skill in the art would understand that this design can be modified to provide a bracket that supports and/or accommodates electrical fixtures, such as switches or receptacles, and/or communication fixtures, such as data plugs, coaxial connectors, fiber optic connectors and the like, which provide for termination of voice, data or signal wires.

The assembly 10 particularly includes a mounting frame 100 with at least one screw guide for supporting a removeably installed anchor screw. The anchor screw tip 59 is shown radially protruding from the assembly. The frame 100 can be made of various materials, however, it is preferably made of die-cast zinc, aluminum or other metals and suitable materials for the particular application.

Additionally, the assembly preferably includes a cover 200, intumescent member 210, and lower assembly elements 220, 230, 240, 241. In the particular example shown, the assembly 10 is made in a circular or cylindrical configuration. However, it should be understood that the assembly is preferably formed or adapted to the shape and size of the hole in which it is intended. Also, although the details and alternative designs for the cover 200, intumescent member 210 and lower assembly elements 220, 230, 240, 241 are not fully elaborated herein, it should be understood that such elements can vary from the exemplary designs shown. While the preferred embodiment is described in the context of a concrete floor installation, the invention is suitable for installations in structures comprised of other materials and configurations.

FIGS. 2 through 8 show further details of the frame 100 and other assembly structures. In particular, the frame 100 preferably includes a flange 110 that radially protrudes from the upper edge of a substantially annular ring or wall member 120. While wall 120 can be a continuous unitary member, it can also be formed with cutouts, apertures or protrusions that otherwise interrupt its generally uniform annular shape. Also, integrated into the combined structures of the flange 110 and the wall 120, the frame 100 can include mounting portion 102 intended to secure the cover 200 to the frame 100. As particularly shown in FIG. 6, the mounting portion 102 preferably includes one or more reinforcing structures 112, 113 and an aperture 114 for receiving a screw or other fastener. Also, while the upper surface of the mounting portion 102 is shown flush with the rest of the upper surface of the flange 110, either a vertically recessed or protruding surface for the mounting portion 102 could alternatively be provided.

Figure 4A:
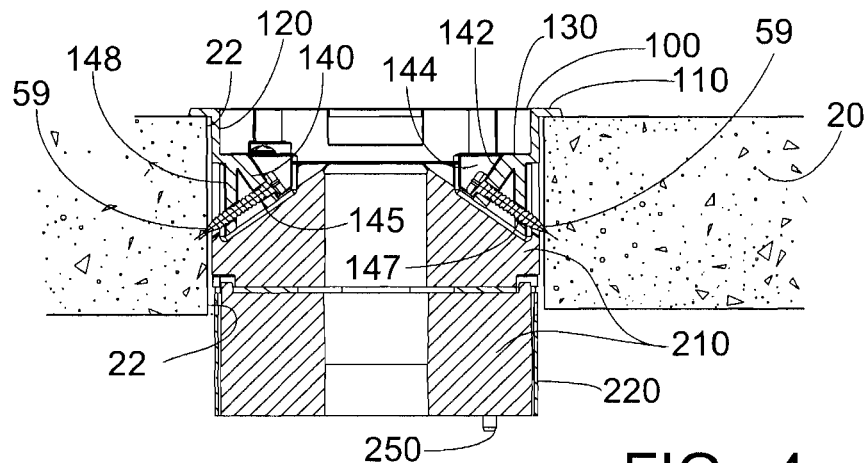
FIG. 4a is a side section view of the assembly shown at A-A in FIG. 3.
Figure 4B:
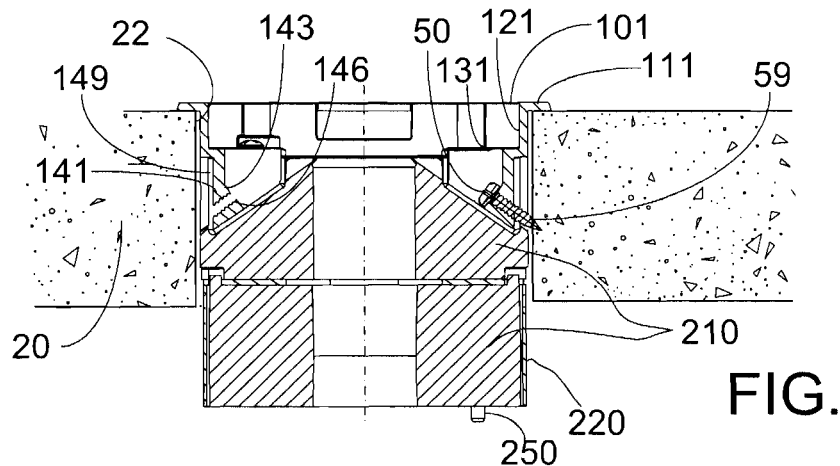

As particularly shown in FIGS. 4a and 4b, the wall 120, 121 is preferably suitable sized to fit inside the hole 22 in the floor structure 20 in which it is installed. In contrast, the flange 110, 111 radially extends outwardly past the diameter of the hole 22, providing an overhang. Thus, flange 110, 111 preferably prevents the frame 100, 101 from completely falling into the hole, at least during the installation process. The flange 110, 111 can rest on the upper surface of the floor 20 as shown or be supported by an intermediate washer, gasket or other structure (not shown).

Figure 2:
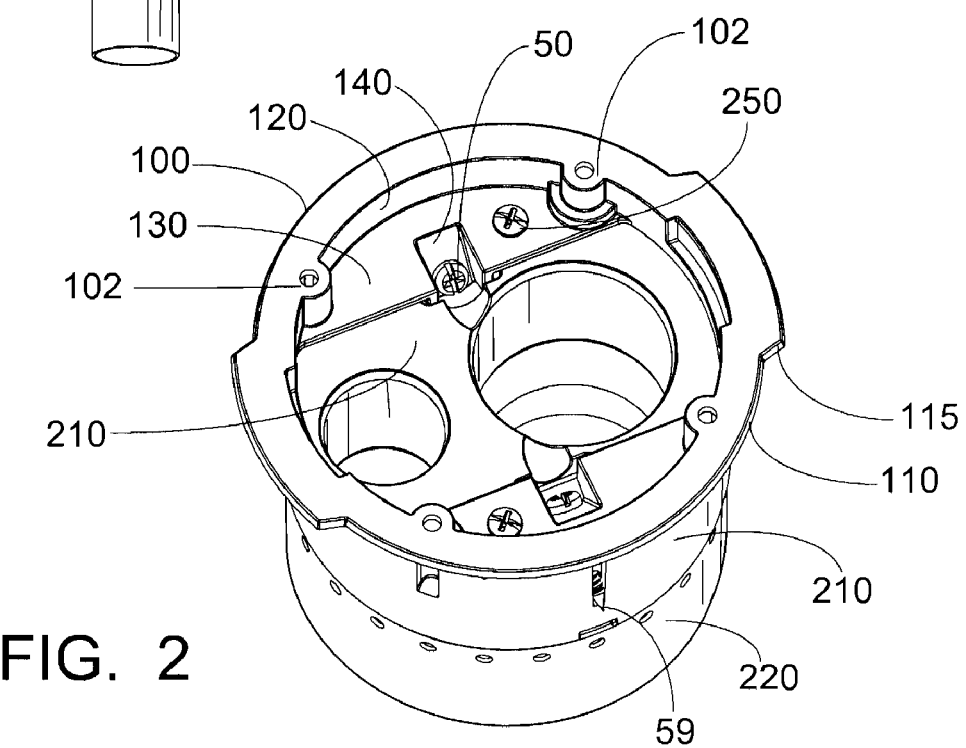
FIG. 2 is a top perspective view of the assembly shown in FIG. 1, with the cover and lower conduit assemblies removed.
Figure 3:
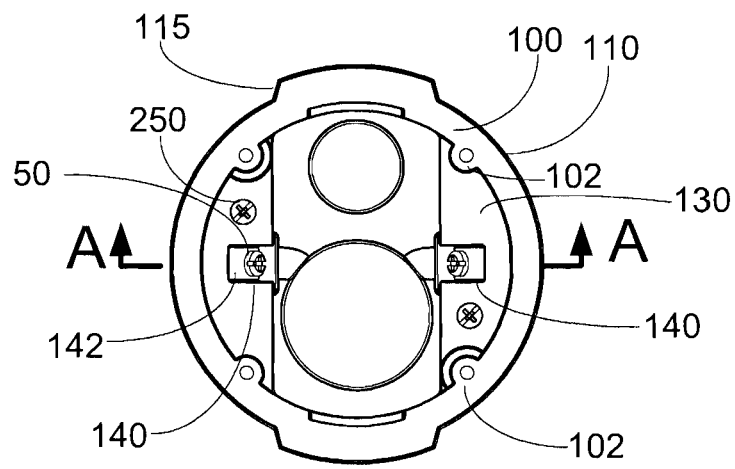
FIG. 3 is a top plan of the assembly shown in FIG. 2.

Additionally as shown in FIGS. 2 and 3, the flange 110, 111 can include further protruding portions 115 that extend radially beyond the normal diameter of the flange 110, 111. Such protruding portions 115 can serve as handles during installation or even mate with the design of the cover 200 to prevent relative rotational movement there between. It should be understood, however, that while flange 110, 111 is shown to be a continuous annular member, it can alternatively be formed by two or more radial protrusions that are circumferentially spaced from one another.

The frame 100, 101 also preferably includes an inner platform or bracket 130, 131 which can provide a support structure and means for securing the lower assembly elements 210, 220, 230, 240, 241 thereto. Additionally, bracket 130, 131 preferably provides support for the anchor screw guide 140, 141. As shown, at least an upper portion of the screw guide 140, 141 is formed as a recess in the bracket 130, 131. In this way, the head of anchor screw 50 when installed in the screw guide 140, 141 can also be recessed below the upper surface of bracket 130, 131. Such a configuration preferably avoids interference of the anchor screw 50 with the cover or other structures mounted in the frame 100, 101.

The anchor screw guide 140, 141 is preferably designed to receive and guide a screw 50, which serves as an anchor for the assembly 10 within the hole, preferably preventing pull-out and rotation of the assembly 10. The screw guide 140, 141 is preferably formed as a unitary element. The cost of most suitable screws 50 should be significantly less expensive than the traditional stamped steel retaining ring. The anchor screw 50 is generally inserted into the screw guide 140, 141 from above the frame 100 at an angle. The screw guide 140, 141 is designed to allow at least the tip 59 of the anchor screw 50 to radially protrude outside the perimeter or diameter of the annular wall 120. In fact, preferably the anchor screw 50 should protrude far enough outside the annular wall 120 to allow the screw tip 59 to fully engage and bite, dig or wedge into or bias against the wall surface 22 of the hole in which it is installed. This type of biting engagement is not intended to significantly penetrate the wall surface 22. Preferably, the screw tip 59 only slightly breaks the surface 22 in order to provide an enhanced frictional engagement. This type of biting engagement serves not only to vertically secure, but also to center the overall assembly 10 within the hole. Additionally, the engagement of screw tip 59 will not only resist the overall assembly from being pulled-out of the hole, but will also preferably resist rotation of the assembly 10 within the hole. The examples shown in FIGS. 4*a* and 4*b* illustrate the biting engagement in a concrete floor installation. Such an application preferably uses a sharply pointed screw tip 59. However, a more blunt screw tip 59 could be used for softer surfaces 22. Also, the length of the screw is preferably selected to suit the particular application. Additionally, suitable metallic or ceramic washers could be used in combination with the anchor screw 50 as desired. While metal washers are less expensive, ceramic washers could provide a thermal barrier or heat dissipating effect if the assembly 10 were subjected to a spiking thermal event, such as a fire.

Figure 5:
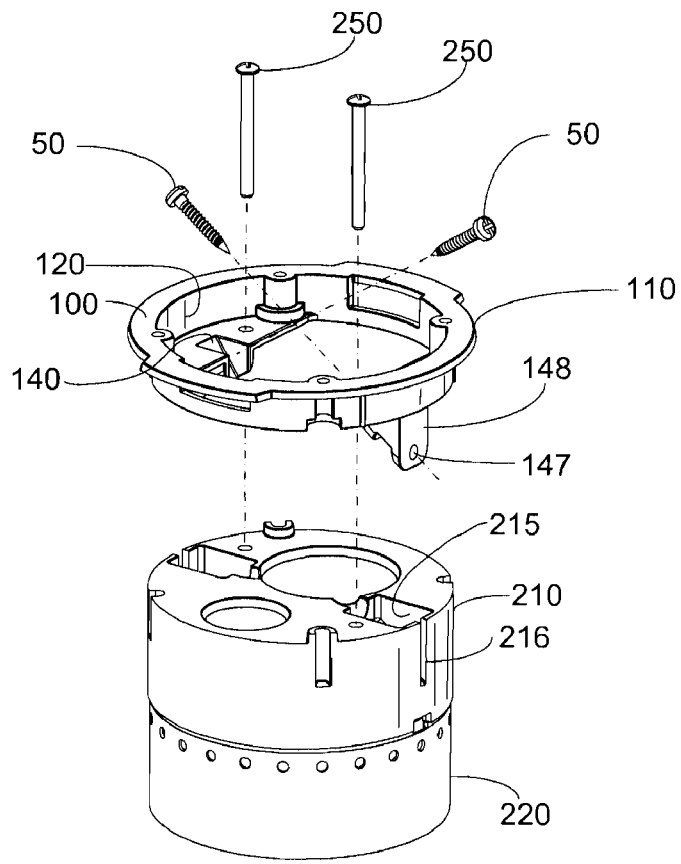
FIG. 5 is a partially exploded top perspective view of the assembly shown in FIG. 2.
Figure 6:
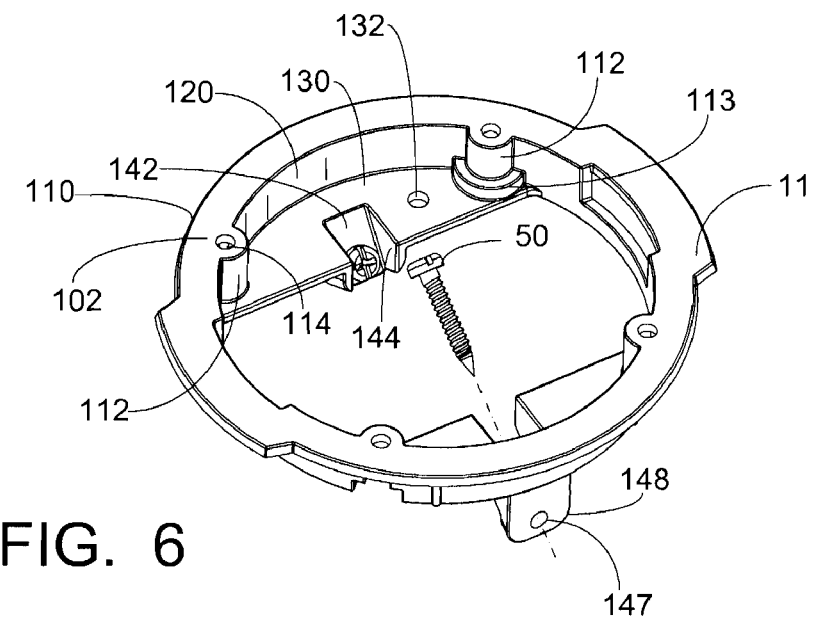
FIG. 6 is a partially exploded top perspective view of an outlet box frame with two anchor screws in accordance with the present invention.
Figure 7:
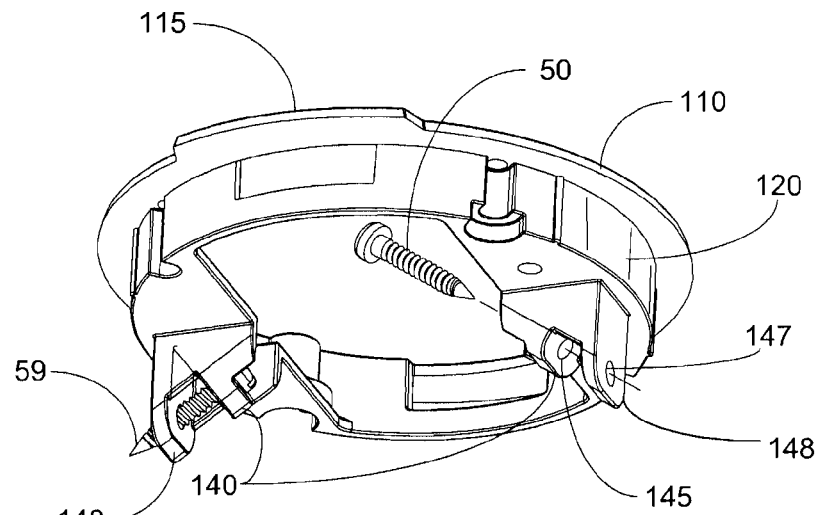
FIG. 7 is a partially exploded bottom perspective view of the assembly shown in FIG. 6.
Figure 8:
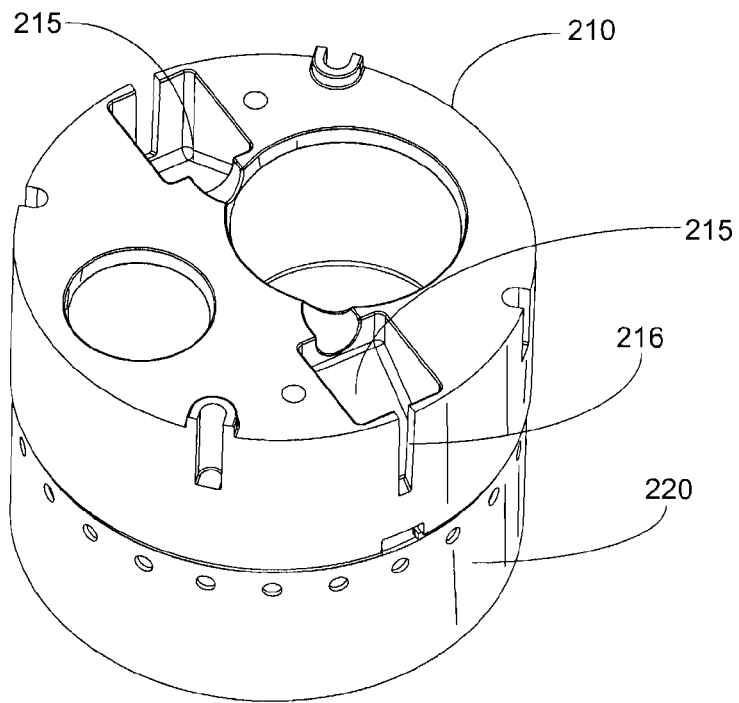
FIG. 8 is a top perspective view of the lower assembly elements shown in FIG. 5.

Additionally shown in FIGS. 2 and 5, frame 100 is preferably secured to the intumescent member 210 and some of the lower assembly elements 220 (not all shown) through axial bolts 250. Preferably, the bracket 130 is provided with an aperture 132 for receiving and securing an upper portion of the bolts 250. Also, because the screw guides 140, 141 vertically project beyond the lower portion of the frame wall 120, the adjacent intumescent member 210 is preferably provided with cups or recesses 215 for accommodating these projecting structures. Further, the intumescent member 210 is preferably provided with at least one aperture or slot 216. The aperture 216 is preferably formed to allow the anchor screw 50 to pass beyond the outer diameter of the intumescent member 210 and bitingly engage the wall surface 22 of the hole in which the assembly 10 is installed. Although aperture 216 is shown as a vertical slot, it should be understood that such an aperture could be almost any other size or shape. Providing a slot 216 that is open at the upper surface of the intumescent member 210, allows a technician to separate the frame 100 from the intumescent 210 without fully removing the anchor screw 50. Alternatively, no aperture 216 need be provided, as the installer can either pre-drill a hole on-sight or punch/screw the anchor screw through the outer wall of recess 215.

An embodiment of the screw guide 140, is shown in FIG. 4*a*. This embodiment is preferably provided with a recess in the bracket 130, which includes upper support surface 142 and two sidewalls 144 (also shown in FIG. 6). The upper support portion 142 is designed to initially receive the screw 50 and support the upper end of the screw shaft. Preferably, when the screw tip 59 is properly engaged with the wall 22 of the hole 20, the screw head is also engaged with the upper surface of the upper support portion 142. However, the depth of the recess in the bracket 130 is preferably sufficiently deep such that even if the screw head is not fully seated against the upper surface of the upper support portion 142, the screw head will preferably not protrude upwardly beyond the surface of bracket 130. Additionally, the screw guide 140 is preferably provided with a lower support portion 148. The anchor screw 50 also penetrates the lower support portion 148. The shaft of the anchor screw 50 is thus provided with further support closer to the screw tip 59, preventing an overstressed cantilever condition at the base of the screw head and distributing the shear stresses across the anchor screw 50.

Another embodiment of the screw guide 141, is shown in FIG. 4*b*. This embodiment combines the upper and lower support portions into a single support portion 143 preferably disposed on an outer wall 148 of screw guide 141. As illustrated, this embodiment may require selection of a shorter anchor screw 50.

Preferably, the support portions 142, 143 and outer wall 148, 149 are respectively provided with screw apertures 145, 146, 147. Preferably, the central axis of the apertures 145, 146, 147 is angled at forty-five degrees from the plane of the upper surface of the floor 20. Alternatively, the apertures can be configured for other desired angles, such as angles smaller or greater than forty-five degrees. Thus, the apertures 145, 146, 147 can ensure the screw anchor is installed at the desired angle. Also, it should be understood that any one or all of the support portions 142, 143, 148, 149 could be formed without a pre-formed aperture, thus allowing the installer to either drill a hole or simply punch the anchor screw 50 through that portion of the frame 100, 101. Thus, without a pre-formed aperture 145, 146, 147, the installer dictates the angle between the screw anchor and the surrounding structures.

Figure 9A:
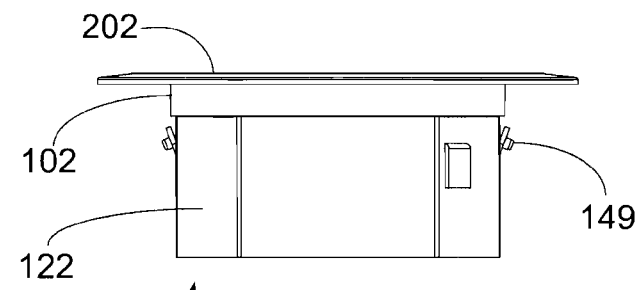
FIGS. 9a, 9b and 9c are side, top perspective and bottom views, respectively of an alternative assembly in accordance with the present invention.
Figure 9B:
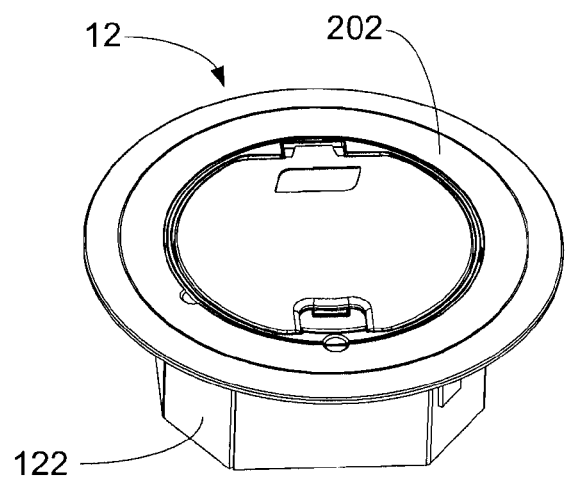
Figure 9C:
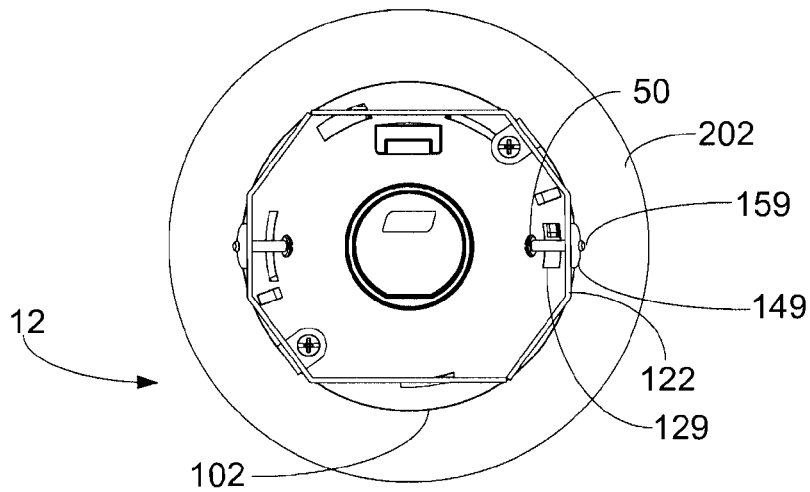

Another embodiment of the present invention is illustrated in FIGS. 9*a*, 9*b* and 9*c*. The assembly 12 includes frame 102 and cover 202. This embodiment demonstrates a non-circular design for frame 102 as an alternative to the more traditional annular design described above. It should be understood that although the above designs illustrate and describe assemblies with circular or annular shapes, and particularly perimeters, when viewed from the top, such assemblies can be formed in other geometric shapes. Also, the overall shape of the perimeter can include protrusions and/or be asymmetric. The frame 102 preferably includes a wall member 122 that is formed into a hexagonal shape when viewed from above or below (as shown in FIG. 9*c*) is an example of such a non-circular design. While such a frame is preferably formed of galvanized steel, other suitable materials could alternatively be used.

The assembly 12 preferably further includes an alternative screw guide 149 design. In particular, screw guide 149 is preferably formed by a section of material partially cutout and bent outwardly away from the wall member 122. Such a cutout leaves an aperture 129 in a portion of wall member 122 and a protruding tab that serves as the screw guide. The protruding tab 149 preferably includes a threaded aperture 159 for receiving anchor screw 50 as shown in FIG. 9*c*. It should be understood that while frame 102 is shown with tab 149 bent outwardly and a pre-formed screw aperture 159, these features can be formed or finalized just prior to installation. For example, the tab 149 can be formed by perforations through the wall 122, but not bent away therefrom. In this way the installer would push out the tab 149 with a simple tool to an appropriate angle, as shown in FIG. 9*a*. Additionally, the threaded aperture 159 can alternatively be left to the installer to drill or otherwise form during or prior to installation.

Additionally, although assembly 12 is also shown as a furniture feed design, it should be understood that a bracket could be formed therein to support and secure fixtures or lower assembly elements. Such a bracket could be disposed either above or below the tab 149, as suited for a particular application.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An outlet box frame for installation in a hole in a floor structure, the hole having a perimeter and defining an internal wall surface in said floor structure, said frame comprising:

a walled member sized for insertion within said hole;
at least one flange portion extending outward from said walled member, wherein once installed at least a portion of said flange extends from said walled member past said internal wall surface; and
a unitary retaining screw guide for supporting a retaining screw, said retaining screw guide supported from said walled member and configured to receive said retaining screw therein, wherein upon installation said retaining screw inserted in said retaining screw guide engages said hole wall without significant penetration thereof, providing at least pullout resistance of said frame from said hole.

2. An outlet box frame as defined in claim 1, further comprising:
a cover-mounting portion for securing an outlet box cover relative to said walled member.

3. An outlet box frame as defined in claim 1, further comprising:
an outlet box bracket for supporting an outlet box fixture at least partially within said frame, said outlet box bracket extending from said walled member.

4. An outlet box frame as defined in claim 1, wherein said screw guide is disposed below at least a portion of said walled member.

5. An outlet box frame as defined in claim 1, wherein a first portion of said screw guide is configured to hold at least a central shaft portion of said retaining screw upon installation.

6. An outlet box frame as defined in claim 5, wherein a second portion of said screw guide is configured to hold a portion of said retaining screw remote from said central shaft portion.

7. An outlet box frame as defined in claim 6, wherein said first and second portions of said screw guide are integrally formed.

8. An outlet box frame as defined in claim 1, further comprising said retaining screw disposed at least partially within said screw guide.

9. An outlet box frame as defined in claim 8, wherein said retaining screw further provides rotational resistance for said frame relative to said hole.

10. An outlet box assembly for installation in a hole in a floor structure, said hole having a circumference and defining an internal wall surface in said floor structure, said assembly comprising:
a screw anchor; and
a frame for passing at least one of power and communication cables therethrough, said frame including an external wall, at least one flange portion and a screw guide for supporting said screw anchor, said external wall covering a portion of said internal wall, said at least one flange portion extending from said external wall outwardly past said internal wall, said screw guide disposed below said flange and configured to receive said retaining screw therein, wherein upon installation said retaining screw disposed partially within said screw guide engages said hole wall without significant penetration thereof and preventing pullout of said frame from said hole.

11. An outlet box assembly as defined in claim 10, further comprising:
an intumescent member disposed below said frame for resisting heat transfer through said hole.

12. An outlet box assembly as defined in claim 10, wherein said at least one flange portion is integrally formed with said external wall.

13. An outlet box assembly as defined in claim 10, wherein said retaining screw further resists rotation of said frame relative to said internal wall.

14. An outlet box assembly as defined in claim 10, wherein a first portion of said screw guide is configured to hold at least a central shaft portion of said retaining screw upon installation.

15. An outlet box assembly as defined in claim 10, wherein a second portion of said screw guide is configured to hold a portion of said retaining screw remote from said central shaft portion.

16. An outlet box assembly as defined in claim 10, wherein said first and second portions of said screw guide are integrally formed.

17. An outlet box assembly for installation in a hole in a floor structure, said hole defined by internal walls that extend from an upper surface of said floor structure, said device comprising:
a first frame element for supporting an outlet box cover, said first frame element including at least one protruding portion, wherein upon installation said protruding portion extends beyond said internal walls for engaging at least a portion of said floor upper surface;
a second frame element extending from said first frame element, wherein upon installation said second frame element is substantially disposed within said hole, said second frame element including a unitary screw guide for supporting a retaining screw, said screw guide configured to receive said retaining screw therein, wherein upon installation said retaining screw inserted in said screw guide engages said internal walls of said hole without significant penetration thereof resisting at least one of pullout and rotation of said frame elements relative to said hole.

18. An outlet box assembly as defined in claim 17, wherein a first portion of said screw guide is configured to hold at least a central shaft portion of said retaining screw upon installation.

19. An outlet box assembly as defined in claim 18, wherein a second portion of said screw guide is configured to hold a portion of said retaining screw remote from said central shaft portion.

20. An outlet box assembly as defined in claim 19, wherein said first and second portions of said screw guide are integrally formed.

* * * * *